Aug. 7, 1928.  1,679,748
R. A. STRATTON
DENTAL APPLIANCE FOR INDICATING THE OUTLINE OF THE FACE
Filed Feb. 23, 1927    4 Sheets-Sheet 1
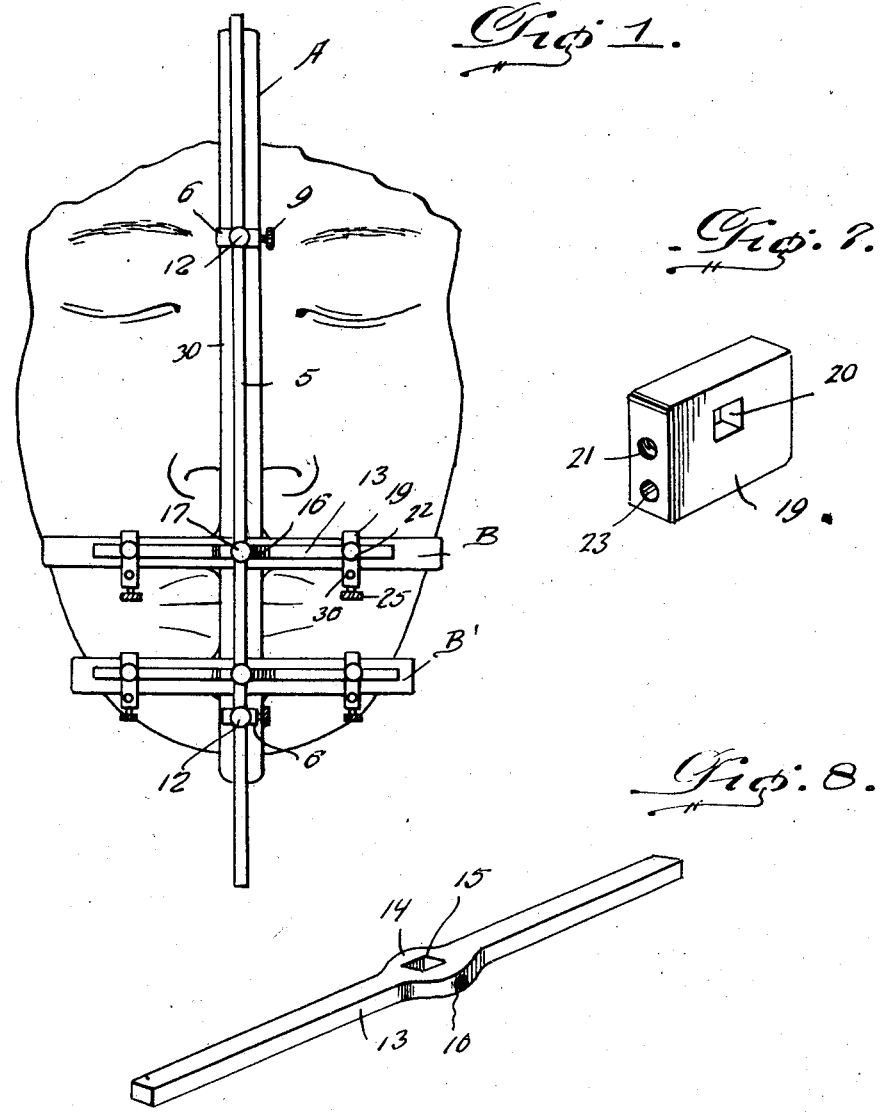
Inventor
R. A. Stratton
By Clarence A. O'Brien
Attorney

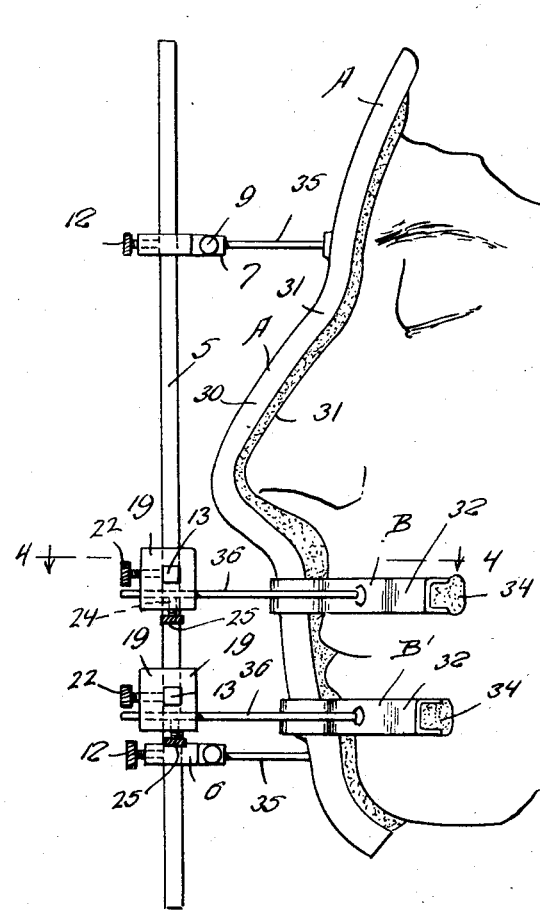
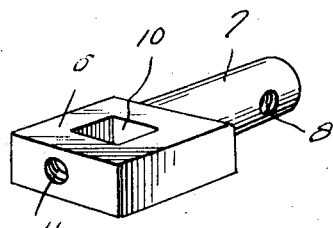

Fig. 3.

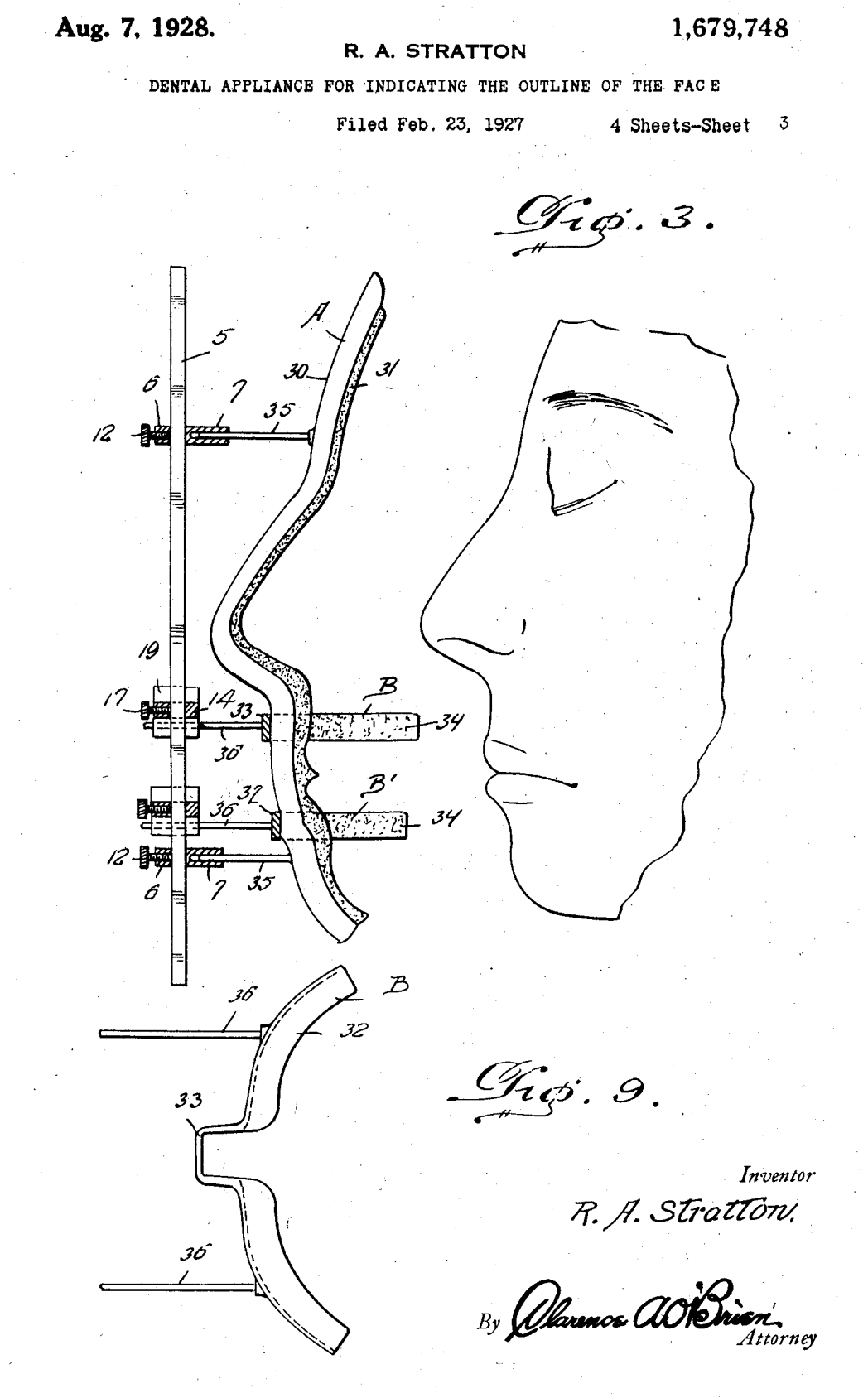

Fig. 9.

Inventor
R. A. Stratton,

By *Clarence A. O'Brien*
Attorney

Aug. 7, 1928.　　　　　　　　　　　　　　　　　1,679,748
R. A. STRATTON
DENTAL APPLIANCE FOR INDICATING THE OUTLINE OF THE FACE
Filed Feb. 23, 1927　　　　4 Sheets-Sheet 4
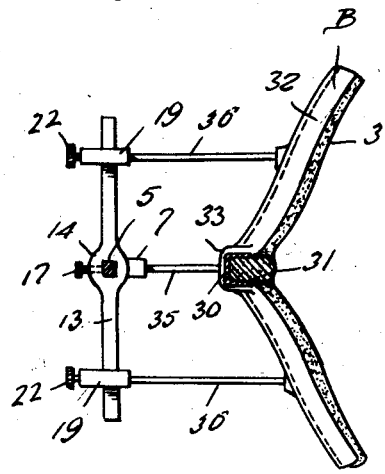
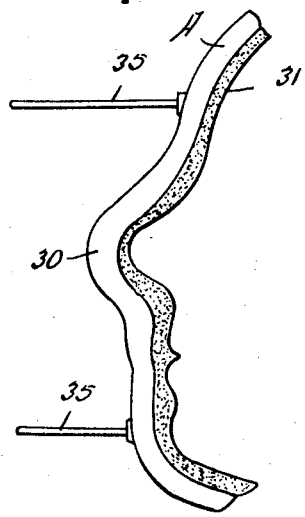
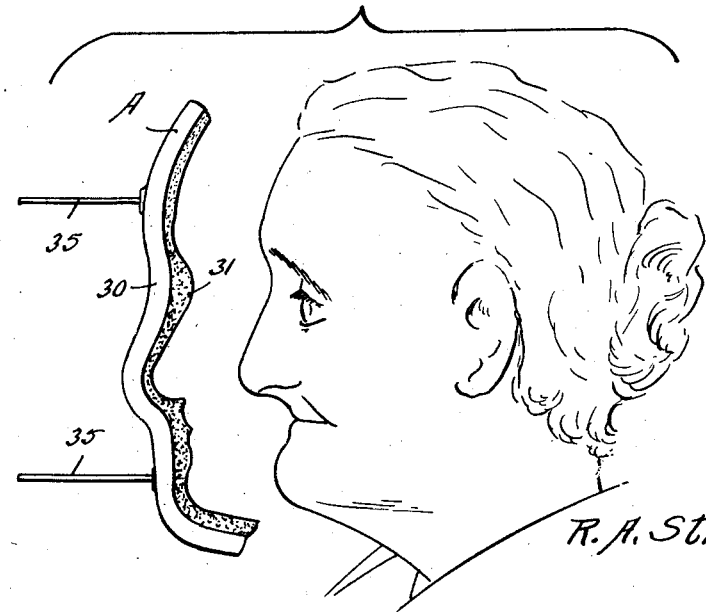
Inventor
R. A. Stratton
By Clarence A. O'Brien
Attorney Patented Aug. 7, 1928.

1,679,748

UNITED STATES PATENT OFFICE.

RAY A. STRATTON, OF HURON, SOUTH DAKOTA.

DENTAL APPLIANCE FOR INDICATING THE OUTLINE OF THE FACE.

Application filed February 23, 1927. Serial No. 170,276.

The present invention relates to a device for use by dentists so that they may maintain a record indefinitely of the outlines of a patient's face before the extraction of his or her teeth in order that after the gums have properly absorbed and hardened false teeth may be constructed and fitted to restore the facial outline and contour as it was before extraction.

The primary object of my invention is to provide a device of simple and inexpensive construction which may be readily manipulated to present a conformation corresponding to the curvature of the face before extraction and which enables any dentist to correctly construct and fit a set of false teeth after the shrinkage and tightening of the gums so as to restore the face to its initial or pre-extraction conformation.

Under the present practice this is accomplished by mere guess work on the part of the dentist but with my improved apparatus records may be maintained which will insure accuracy at a very small expense to the patient.

A still further object of the invention lies in the provision of a device of this nature which is thoroughly reliable in use, easy to handle, thoroughly adaptable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a rear elevation of the device showing the same applied to a face of a patient, Figure 2 is a side elevation thereof showing the same applied, Figure 3 is a sectional elevation thereof showing the same after having been removed from the face, Figure 4 is a horizontal section taken substantially on the line 4—4 of Fig. 2, Figure 5 is a side elevation of the vertical face-engaging member, Figure 6 is another view thereof showing the same about to be applied to the face of an individual with shrunken gums having had her teeth extracted, Figure 7 is a perspective view of one of the slidable blocks, Figure 8 is a perspective view of one of the cross arms, Figure 9 is an elevation of the transverse face engaging member, Figure 10 is a perspective view of another of the slidable blocks.

Referring to the drawing in detail it will be seen that 5 denotes a vertical bar which is straight and preferably constructed with a square cross section. A pair of blocks 6 are formed with socket members 7 projecting therefrom each of said socket members having a transverse threaded opening 8 for receiving a set screw 9. Each block is constructed with a square opening 10 to slidably receive the bar 5 and with a threaded opening 11 entering the opening 10 so that a set screw 12 may be threaded therein to bind against the vertical bar 5.

A pair of horizontal bars 13 have intermediate thickened portions 14 at their centers provided with set screws to receive the vertical bar 5 and are further provided with openings 16 threaded to receive set screws 17 in order that the transverse bars 13 may be held in different adjusted positions in proper relation to the upper and lower jaws of the patient as will become apparent as the description proceeds. On each transverse bar 13 there is slidable a pair of blocks 19 having square openings 20 to slidably receive the bar 13 and threaded openings 21 to receive set screws 22 in order that the blocks may be held in different adjusted positions on said bars 13. These blocks are further provided with openings 23 extending through the length thereof as is indicated by dotted lines clearly in Figures 2 and 3 and further with transverse threaded openings 24 for receiving set screws 25. The parts thus far described relate to the frame structure of my appliance.

I shall now describe in detail the face-engaging record. The vertical record is indicated generally by the letter A, the transverse records are indicated by the letters B and B'. The vertical record includes a channeled member 30 preferably formed of some pliable metal to carry and contain a plaster of Paris filling 31 which projects therefrom sufficiently to engage the face as is indicated to advantage in Figure 1, the member 30 being previously shaped to the general contour of the face. The members B and B' are similar except that the latter is somewhat smaller than the former and these include channel members 32 connected by a U-shaped portion 33 that is adapted to extend about the channel member 30. Plaster of Paris filling 34 is mounted in the members 32 which are somewhat arcuate for engaging the face at the gums of the upper and lower jaws. Rods 35 project from the channel member 30 while rods 36 project from the channel member 32. The rods 35 are receivable in the socket members 7 while the rods 36 are receivable in openings 23.

In manufacturing this appliance a plurality of different sized and approximately shaped records will be furnished. The dentist before extraction will select those records which approximate the conformation and contour of the patient's face making needed changes by cutting, trimming or bending and will mount the records in the frame structure as previously indicated, the necessary adjustment being made through set screws 9 and 25 as will be quite apparent. The records are then filled with plaster of Paris and applied to the patient's face before the plaster of Paris filling has set as is indicated to advantage in Figures 1 and 2. The record mask of the patient's facial conformation may then be removed as is clearly shown in Figure 3. The records of this mask may be preserved so that after the patient's teeth have been extracted and the gums have shrunken and hardened, the mask may be applied to the face such as is indicated with the vertical record in 6 and thus false teeth may be more accurately fitted to restore the original facial expression, outline, conformation, and the like.

This appliance also permanently records the bite, giving for any future use the original relationship of the lower arch to the upper.

It is thought that the construction, operation, and advantages of this invention will now be clearly understood without a more detailed description thereof. It will be readily understood that my invention enables the dentist to maintain a record as to the curvature of the face in all essential details for restoration thereof after the shrinking and hardening of the gums, thus allowing the false teeth to be set in a natural manner to obtain the maximum of efficiency and comfort to the patient. This enables the dentist to do the work to a nicety. The device is simple and inexpensive in construction and is sufficiently durable to last indefinitely. Changes in the form, construction, and operation of the parts may be made without departing from the spirit and scope of the invention or sacrificing any of its material advantages. The form herein described, however, is what I now regard as the preferred embodiment of the invention since in actual practice it attains the features of advantage enumerated as desirable in the statement of the invention and the above description.

Having thus described my invention what I claim as new is:—

1. A device of the class described including, in combination, a frame consisting of a vertical bar, a pair of transverse bars, means for adjustably mounting the transverse bars on the vertical bar, a vertical record mask member, means for mounting the mask member on the vertical bar, a pair of transverse record mask members, and means for mounting the transverse record mask members on the transverse bars.

2. A device of the class described including, in combination, a frame consisting of a vertical bar, a pair of transverse bars, means for adjustably mounting the transverse bars on the vertical bar, a vertical record mask member, means for mounting the mask member on the vertical bar, a pair of transverse record mask members, and means for mounting the transverse record mask members on the transverse bars, each mask member including a channeled structure adapted to receive plastic material.

3. A device of the class described including, in combination, a frame consisting of a vertical bar, a pair of transverse bars, means for adjustably mounting the transverse bars on the vertical bar, a vertical record mask member, means for mounting the mask member on the vertical bar, a pair of transverse record mask members, and means for mounting the transverse record mask members on the transverse bars, each mask member including a channeled structure adapted to receive plastic material, the transverse mask members being characterized by intermediate U-shaped members to extend around the vertical mask member.

4. A record mask member comprising a channeled member adapted to receive a quantity of plastic material to be applied to the face, and a pair of transverse channel members characterized by intermediate U-shaped portions to receive the first channel member, the second channel members also being adapted to receive plaster of Paris.

In testimony whereof I affix my signature.

RAY A. STRATTON.